United States Patent
Doering et al.

(10) Patent No.: US 10,041,851 B2
(45) Date of Patent: Aug. 7, 2018

(54) MANUFACTURING CATHETER SENSORS

(71) Applicant: Silicon Microstructures, Inc., Milpitas, CA (US)

(72) Inventors: Holger Doering, Sunnyvale, CA (US); Stephen C. Terry, Palo Alto, CA (US); Justin Gaynor, Mountain View, CA (US); Omar Abed, San Jose, CA (US); Fernando Alfaro, Redwood City, CA (US)

(73) Assignee: SILICON MICROSTRUCTURES, INC., Milpitas, CA (US)

(*) Notice: Subject to any disclaimer, the term of this patent is extended or adjusted under 35 U.S.C. 154(b) by 158 days.

(21) Appl. No.: 15/227,370

(22) Filed: Aug. 3, 2016

(65) Prior Publication Data

US 2017/0089788 A1 Mar. 30, 2017

Related U.S. Application Data

(60) Provisional application No. 62/232,394, filed on Sep. 24, 2015.

(51) Int. Cl.
*G01L 19/14* (2006.01)
*G01L 9/00* (2006.01)

(52) U.S. Cl.
CPC .......... *G01L 19/14* (2013.01); *G01L 9/0044* (2013.01); *G01L 9/0057* (2013.01)

(58) Field of Classification Search
CPC ..... G01L 7/022; G01L 9/0041; G01L 9/0042; G01L 9/0044; G01L 2009/0066; G01L 19/14; G01L 19/147
USPC .................................................. 73/726, 756
See application file for complete search history.

(56) References Cited

U.S. PATENT DOCUMENTS

| | | | |
|---|---|---|---|
| 4,576,181 | A | 3/1986 | Wallace et al. |
| 5,551,301 | A | 9/1996 | Cowan |
| 6,030,709 | A | 2/2000 | Jensen et al. |
| 8,714,021 | B2 | 5/2014 | Gamage |
| 9,176,018 | B2 | 11/2015 | Qi |
| 9,289,137 | B2 | 3/2016 | Corl |
| 9,391,002 | B2 | 7/2016 | Belov |
| 2003/0052702 | A1 | 3/2003 | Auburger et al. |
| 2004/0118214 | A1 | 6/2004 | McDonald et al. |
| 2010/0308791 | A1 | 12/2010 | Gowrishetty et al. |
| 2012/0147384 | A1 | 6/2012 | Swiergiel et al. |
| 2014/0238142 | A1 | 8/2014 | Gamage |

(Continued)

FOREIGN PATENT DOCUMENTS

| | | |
|---|---|---|
| JP | H10103911 A | 4/1998 |
| WO | WO 2017/053943 A1 | 3/2017 |
| WO | WO 2017/053943 A8 | 5/2017 |

OTHER PUBLICATIONS

Notification of Transmittal of the International Search Report and the Written Opinion of the International Searching Authority, or Declaration for International Patent Application No. PCT/US2016/053713 dated Jan. 5, 2017, 12 pages.

(Continued)

*Primary Examiner* — Benjamin Schmitt
(74) *Attorney, Agent, or Firm* — Kilpatrick Townsend & Stockton LLP

(57) ABSTRACT

Pressure sensors and their methods of manufacturing, where the pressure sensors have a small, thin form factor and may include features designed to improve manufacturability and where the method of manufacturing may improve yield and reduce overall costs.

28 Claims, 6 Drawing Sheets

(56) References Cited

U.S. PATENT DOCUMENTS

2014/0242740 A1    8/2014   Qi
2015/0001733 A1    1/2015   Karhade et al.
2017/0131167 A1    5/2017   Doering et al.

OTHER PUBLICATIONS

Invitation to Pay Additional Fees and Communication Relating to the Results of the Partial International Search for corresponding International Patent Application No. PCT/US2017/056813 dated Jan. 24, 2018, 11 pages.

MANUFACTURING CATHETER SENSORS

CROSS-REFERENCE TO RELATED APPLICATIONS

This application is a is a nonprovisional of U.S. provisional application No. 62/232,394, filed Sep. 24, 2015, which is incorporated by reference.

BACKGROUND

Pressure sensing devices have become ubiquitous the past few years as they have found their way into many types of products. Utilized in automotive, industrial, consumer, and medical products, the demand for pressure sensing devices has skyrocketed and shows no signs of abating.

Pressure sensing devices may include pressure sensors as well as other components. Pressure sensors may typically include a diaphragm or membrane. Typically, this membrane is formed by creating the Wheatstone bridge in a silicon wafer, then etching away the silicon from the opposite surface until a thin layer of silicon is formed beneath the Wheatstone bridge. The thin layer is a membrane that may be surrounded by a thicker, non-etched silicon wafer portion forming a frame. When a pressure sensor in a pressure sensing device experiences a pressure, the membrane may respond by changing shape. This change in shape causes one or more characteristics of electronic components on the membrane to change. These changing characteristics can be measured, and from these measurements, the pressure can be determined.

Often, the electronic components are resistors that are configured as a Wheatstone bridge located on the membrane. As the membrane distorts under pressure, the resistance of the resistors also changes. This change results in an output of the Wheatstone bridge. This change can be measured through wires or leads attached to the resistors.

In some applications, it is particularly important that a pressure sensor have a specific form factor. For example, in many medical applications, it may be important that the pressure sensor be small, or have a thin form factor, or both.

But pressure sensors having such small form-factors may be difficult to manufacture. For example, these pressure sensors may be too small to use in traditional semiconductor assembly tools for wire bonding or flip-chip assembly. In some cases, the end product itself may be too small to accept pressure sensors mounted in standard semiconductor packages. If a pressure sensor needs to fit inside a small catheter, for example, it may not be possible to employ standard semiconductor packaging and assembly techniques.

Thus, what are needed are pressure sensors with features designed to improve manufacturability, where the pressure sensors have a small, thin form factor that may be readily manufactured and the method of manufacturing may improve yield and reduce overall costs.

SUMMARY

Accordingly, embodiments of the present invention may provide pressure sensors and their methods of manufacturing, where the pressure sensors have a small, thin form factor and may include features designed to improve manufacturability and where the method of manufacturing may improve yield and reduce overall costs.

Again, these pressure sensors may be too small to use in traditional semiconductor assembly tools for wire bonding or flip-chip assembly Thus, in various embodiments of the present invention, individual bond wires may be soldered or welded to the bond pads of the pressure sensor, though in some embodiments of the present invention, wire bonding may be used. To electrically isolate the bond pads from one another, these and other embodiments of the present invention may cover the bond pads of the sensor, along with the wires soldered or otherwise attached to them, with an insulating material such as epoxy, adhesive, sealant, potting substance or the like. In addition to providing electrical insulation, this may provide mechanical protection of the delicate solder bonds during assembly, shipping and operation. Unfortunately, the flow of the epoxy or other sealant may be difficult to control.

Accordingly, an illustrative embodiment of the present invention may provide a pressure sensor having a blocking structure for blocking or limiting a flow of epoxy or other adhesive or potting substance when the epoxy is placed over one or more bond pads on a surface of the pressure sensor. The blocking structure may be between a number of pads and a device identifier. The pads may be wire bonded, soldered, welded, or attached using other technique and covered with epoxy. The blocking structure may protect the device identifier from being covered by the epoxy. The device identifier may include date information, manufacturer identification information, manufacturing site identification information, mask layer revision information, and other types of information.

The blocking structure may be a trench that is formed by etching along with a device identifier. The trench and device identifier may be etched using a KOH etch, laser etch, a deep-reactive ion etch (DRIE), or other type of etch. The trench may be located between the device identifier and a number of bond pads. After wires have been connected to the bond pads, an epoxy may be placed over the bond pads. The trench may halt, block, or otherwise stop the flow of epoxy from reaching the device identifier. This may increase yield by preventing losses that otherwise may result when the epoxy flows enough to cover the device identifier. This trench may also lead to more consistent placement of the epoxy and a more consistent covering of the bond pads by the epoxy.

In these and other embodiments of the present invention, the blocking structure may be a bar that is formed by deposition, plating, by forming solder bumps or other techniques along with the bond pads. The bar may be located between the device identifier and a number of bond pads. After wires have been connected to the bond pads, an epoxy may be placed over the bond pads. As with the trench, the bar may halt, block, or otherwise stop the flow of epoxy from reaching the device identifier. As before, this may increase yield and lead to more consistent placement of the epoxy and a more consistent covering of the bond pads by the epoxy.

In these and other embodiments of the present invention, the blocking structure may include both a bar and a trench, two or more bars, two or more trenches, or combination thereof. In these embodiments of the present invention, a bar may be between a trench and the device identifier, a trench may be between a bar and the device identifier, two bars may be between one or more pads and the device identifier, or two trenches may be between one or more pads and the device identifier. Also, in other embodiments of the present invention, the blocking structure may be used to protect other features on the pressure sensor, such as other bond pads, the sensor membrane, other electrical components formed in or placed on the pressure sensor, or other structure.

These and other embodiments of the present invention may provide a pressure sensor having side tabs that may be used when the pressure sensor is held in a fixture. The side tabs may then be separated or otherwise removed before use.

These tabs may be formed with the pressure sensor as extensions on each side of the pressure sensor near the bond pads. In other embodiments of the present invention, they may be attached to another portion of a pressure sensor. The tabs may be placed in a fixture to hold the pressure sensor in place during further manufacturing, for example during the attachment of bond wires to the bond pads and the application of an epoxy or other adhesive or potting substance over the bonded pads. Holes may be drilled or etched in the tabs near the body of the pressure sensor. The holes may be etched using a KOH etch, a DRIE, laser, or other etching technique. These holes may facilitate the removal of the tabs. For example, in one embodiment of the present invention, the holes may act as perforations that enable the side tabs may be snapped off the pressure sensor. In other embodiments of the present invention, the tabs may be removed by sawing, cutting, laser etching, or other technique, either with or without the presence of the holes. These tabs may improve and simplify the process of attaching bond wires to the pressure sensor, the application of an adhesive or potting substance over the bond wires, or other manufacturing steps. This improvement and simplification may reduce yield losses and reduce overall manufacturing costs.

These and other embodiments of the present invention may provide pressure sensors having a narrowed handle portion such that the handle area is less likely to contact a housing for a pressure sensor during use. Specifically, an embodiment of the present invention may provide a pressure sensor having a wider base portion and a narrowed handle. The handle may be narrowed to avoid contacting a bottom of a housing while in use. The handle may also be thinner to avoid contacting sides of a housing while in use. The wider base portion may be thicker and may be epoxied or otherwise fixed with an adhesive to a bottom of the housing. The thinner handle may also prevent the migration of the epoxy under the handle, which could otherwise stiffen and reduce a sensitivity of the pressure sensor. A membrane may be formed in the thinner and narrower handle portion of the pressure sensor. A number of bond pads may be formed in the wider and thicker base portion of the pressure sensor. This may reduce the number of pressure sensors that are in contact with a housing after manufacturing, thereby increasing yield and reducing manufacturing costs.

These and other embodiments of the present invention may provide a pressure sensor having a number of pads in a wider base portion. The pads may be staggered such that they have a different height relative to a bottom edge of the pressure sensor. These differing heights may facilitate the attachment of bond wires to the bond pads during the assembly of devices that include these pressure sensors. This may improve yield and reduce manufacturing costs.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
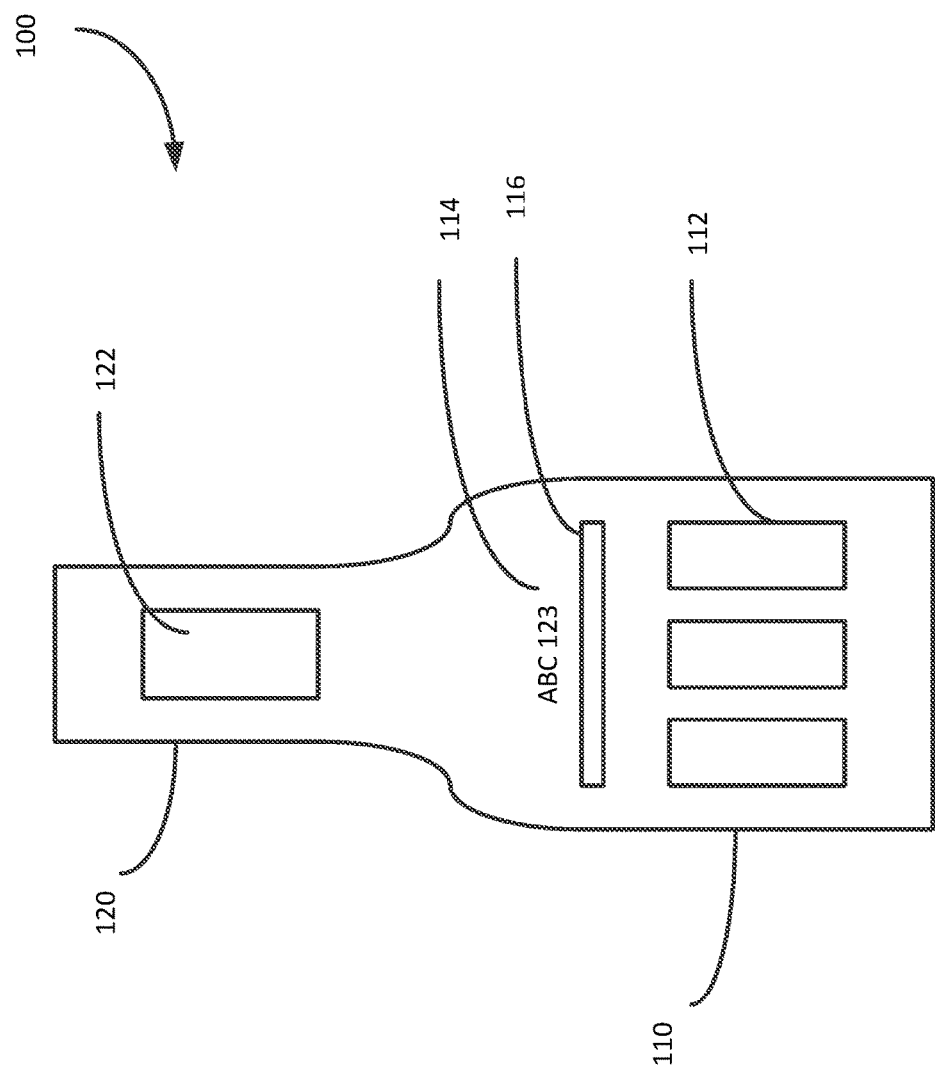
FIG. 1 is a top view of a pressure sensor having a blocking structure according to an embodiment of the present invention.

FIG. 1 is a top view of a pressure sensor according to an embodiment of the present invention. This figure, as with the other included figures, is shown for illustrative purposes and does not limit either the possible embodiments of the present invention or the claims.

Pressure sensor 100 may include a wider base portion 110 leading to a narrowed or tapered handle portion 120. Wider base portion 110 may include a number of bond pads 112 and a device identifier 114. Narrower handle portion may include membrane 122. A number of resistors or other components (not shown) may be formed on or near membrane 122. These components may be used to form a Wheatstone bridge or other circuit to detect or measure pressure, to process the detected or measured pressure, or for other purposes.

Bond wires (not shown) may be attached to bond pads 112 using wire bonding, soldering, welding, or other technique. After the bond wires are attached, an epoxy or other adhesive or potting material may be placed over bond pads 112 to insulate the pads and wires from each other and to secure the bond wires in place. Device identifier 114 may be etched in the top surface of pressure sensor 100. Device identifier 114 may be etched using a KOH etch, laser etch, DRIE, or other type of etch. Device identifier 114 may include may include date information, manufacturer identification information, manufacturing site identification information, mask layer revision information, and other types of information.

Unfortunately, the epoxy applied to bond pads 112 may flow and cover all or a portion of device identifier 114, thereby making device identifier 114 impossible or difficult to read. This may reduce yield and increase manufacturing costs.

Accordingly, these and other embodiments of the present invention may include blocking structure 116 located between device identifier 114 and bond pads 112. Blocking structure 116 may block the flow of epoxy from bond pads 112 before it reaches device identifier 114. This may prevent device identifier 114 from being obscured by the epoxy, thereby increasing yield and reducing costs.

In these and other embodiments of the present invention, blocking structure 116 may be formed in various ways. For example, blocking structure 116 may be a trench that is formed by etching. Blocking structure 116 may be etched using a KOH etch, laser etch, DRIE, or other type of etch. Blocking structure 116 may be etched at the same time as device identifier 114. In other embodiments of the present invention, blocking structure 116 may be etched at a different time using a different step than device identifier 114.

In these and other embodiments of the present invention, blocking structure 116 may be a raised ridge or bar. This raised bar may be metallic and may be formed by deposition, plating, by forming solder bumps or other technique. Blocking structure 116 may be formed by deposition, plating, by forming solder bumps or other technique at the same time as bond pads 112. In other embodiments of the present invention, blocking structure 116 may be a raised bar formed by deposition, plating, by forming solder bumps or other technique at a different time than bond pads 112.

In these and other embodiments of the present invention, device identifier 114 may be formed by deposition, plating, by forming solder bumps or other technique. In this case, one or more, or all, of the bond pads 112, device identifier 114, and blocking structure 116 may be formed at the same time by deposition, plating by forming solder bumps or other technique.

In other embodiments of the present invention, blocking structure 116 may include both a trench and a bar, two trenches, two bars, or other combination thereof. In these embodiments of the present invention, a bar may be between a trench and the device identifier 114, a trench may be between a bar and the device identifier 114, two bars may be between bond pads 112 and device identifier 114, two trenches may be between bond pads 112 and device identifier 114, or other arrangement may be employed. An example is shown in the following figure.

Figure 2:
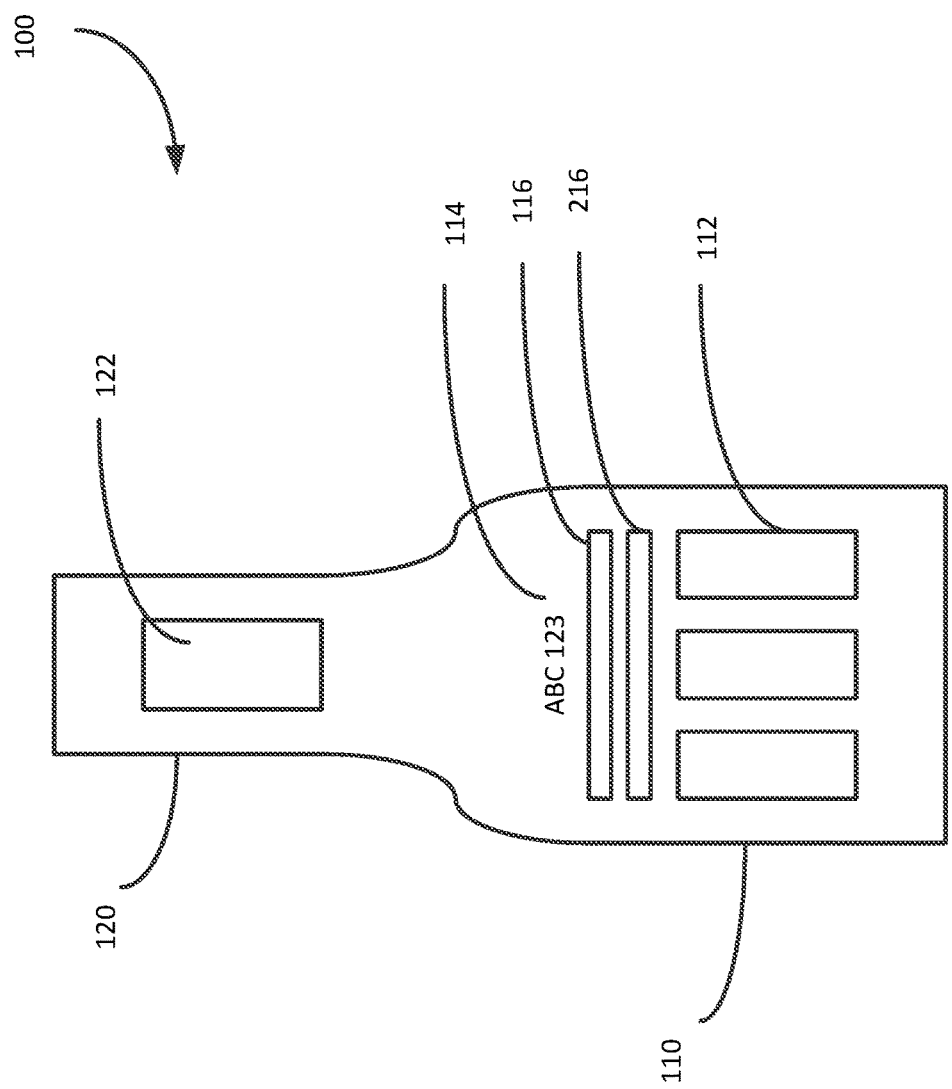
FIG. 2 is a top view of another pressure sensor having a blocking structure according to an embodiment of the present invention.

FIG. 2 is a top view of another pressure sensor according to an embodiment of the present invention. In this example, a second blocking structure 216 is shown as being between a first blocking structure 116 and pads 112. First blocking structure 116 may be a trench while second blocking structure 216 may be a bar, first blocking structure 116 may be a bar while second blocking structure 216 may be a trench, both blocking structures 116 and 216 may be bars, both blocking structures 116 and 216 may be trenches, or they may be other combinations of structures. Pressure sensor 200 shown here may be substantially the same as similar to pressure sensor 100 with the addition of second blocking structure 216.

In these and other embodiments of the present invention, one or more blocking structures, such as bars and trenches, may be used and arranged in various patterns. The bar or trench used as blocking structure 116 may form a complete or partial ring around bond pads 112. Also, in these and other embodiments of the present invention, blocking structure 116 may be used to protect other features on the pressure sensor, such as other bond pads, membrane, other electrical components formed in or placed on the pressure sensor, or other structure. In each of these examples, a second blocking structure 216 may be employed as well. For example, either or both blocking structures 116 and 216 may form complete or partial rings around bond pads 112. Also, in these and other embodiments of the present invention, either or both blocking structures 116 and 216 may be used to protect other features on the pressure sensor, such as other bond pads, membrane, other electrical components formed in or placed on the pressure sensor, or other structure. Either or both blocking structures 116 and 216 may be included in this or any of the other embodiments that are shown here or are otherwise consistent with embodiments of the present invention.

To attach the bond wires to bond pads 112, it may be useful to provide structures to hold pressure sensor 100 in place in a fixture. An example of such a pressure sensor is shown in the following figure.

Figure 3:
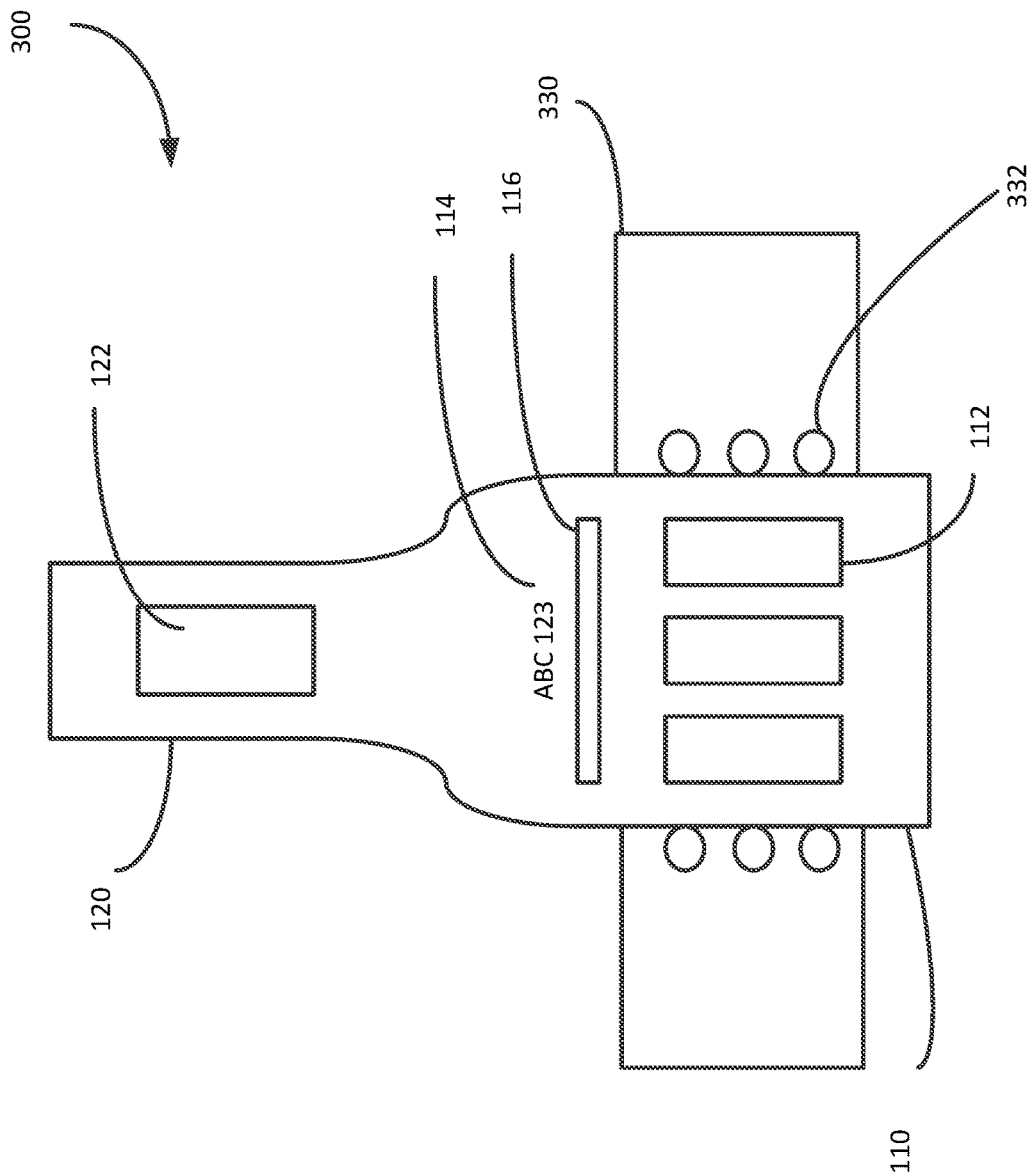
FIG. 3 is a top view of a pressure sensor having side tabs according to an embodiment of the present invention.

FIG. 3 is a top view of a pressure sensor according to an embodiment of the present invention. As before, pressure sensor 300 may include a wider base portion 110 leading to a tapered or narrower handle portion 120. Wider base portion 110 may include bond pads 112. Narrower handle portion 120 may include membrane 122. A number of resistors or other components (not shown) may be formed in or near membrane 122. These components may be used to form a Wheatstone bridge or other circuit to detect or measure pressure, to process the detected or measured pressure, or for other purposes.

Tabs 330 may extend laterally from sides of wider base portion 110. These tabs may be used to hold pressure sensor 300 in one or more fixtures during one or more manufacturing steps. These manufacturing steps may include the attachment of bond wires (not shown) to bond pads 112. Tabs 330 may also be used to hold pressure sensor 300 in place during the application of epoxy or other adhesive or potting material to bond pads 112 after the bond wires have been attached. This may simplify manufacturing, thereby increasing yield and reducing costs. As before, pressure sensor 300 may include one or more blocking structures, shown here as blocking structure 116, to protect device identifier 114.

Tabs 330 may be removed before use of the pressure sensor 300 in various ways. For example, tabs 330 may be sawed or cut off pressure sensor 300. During this procedure, pressure sensor 300 may be held in place using tape, such as UV release tape. In these and other embodiments of the present invention, optional holes 332 may be located in tabs 330. These holes 332 may be near or adjacent to the wider base portion 110 in pressure sensor 300. Holes 332 may be formed by KOH etching, DRIE, laser etching, or other etching process. Holes 332 may act as perforations allowing tabs 332 be snapped off or otherwise removed from the pressure sensor 300. In these and other embodiments of the present invention, tabs 330 may be removed by laser etching along sides of pressure sensor 300, either with or without the presence of hole 332. Tabs 330 may be included in this or any of the other embodiments that are shown here or are otherwise consistent with embodiments of the present invention. Pressure sensor 300 shown here may be substantially the same as similar to pressure sensors 100 and 200 with the addition of tabs 300 and holes 332.

In these and other embodiments of the present invention, it may be desirable that the narrower handle portion does not contact a housing in which pressure sensor resides. Accordingly, in an embodiment of the present invention, the narrower handle portion may be thinned by having a portion of its bottom side removed. An example is shown in the following figure.

Figure 4:
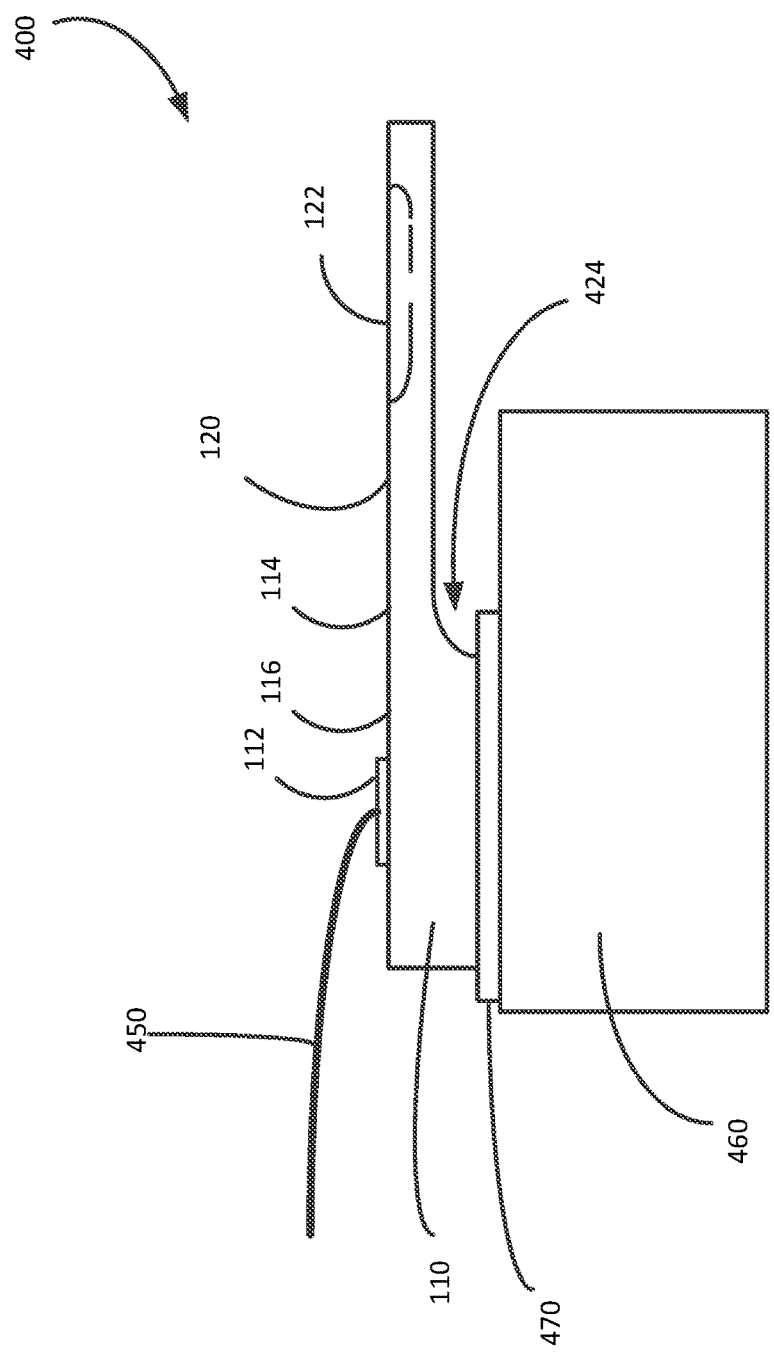
FIG. 4 is a side view of a pressure sensor having a thinned handle portion according to an embodiment of the present invention.

FIG. 4 is a side view of a pressure sensor according to an embodiment of the present invention. As in the other examples, pressure sensor 400 may include a wider base portion 110 and a narrower handle portion 120. A number of bond pads 112 may be located on a top surface of base portion 110. Bond wires 450 may attach to bond pads 112 using wire bonding, soldering welding, or other technique. A membrane 122 may be formed in a top surface of narrower handle portion 120. A number of resistors or other components (not shown) may be formed on or near membrane 122. These components may be used to form a Wheatstone bridge or other circuit to detect or measure pressure, to process the detected or measured pressure, or for other purposes.

Pressure sensor 400 may be attached to housing 460 using adhesive layer 470, which may be an epoxy or other adhesive. Again, it may be undesirable for the narrower handle portion 120 to contact the housing 460. Such contact could reduce the sensitivity of pressure sensor 400 by effectively stiffening handle portion 120. Accordingly, these and other embodiments of the present invention may provide a pressure sensor having a thinned, narrow handle portion 120. In this example, a portion of material 424 has been removed from an underside of narrow handle portion 120, such that narrow handle portion 120 is thinner than base portion 110. This removal of material 424 may prevent handle portion 120 from contacting housing 460 after pressure sensor 400 is installed in place. This removal may also prevent epoxy 470 from migrating under narrower and thinner handle portion 120. Such migration could again stiffen the narrower and thinner handle portion 120 leading to a reduced sensitivity of pressure sensor components formed on diaphragm 122. Preventing this migration may improve yields and decrease costs.

Blocking structures, such as blocking structures 116 and 216 shown in FIGS. 1 and 2, and tabs, such as tabs 330 shown in FIG. 3, may be included in this and any of the other embodiments that are shown here or are otherwise consistent with embodiments of the present invention. For example, device identifier 114 may be placed between bond pads 112 and membrane 122, while one or more blocking structures, shown here as blocking structure 116, may be placed between bond pads 112 and device identifier 114 to protect device identifier 114. Tabs, such as tabs 330 in FIG. 3, may be included, and they may be detached in the same or similar manner. This and any of the other embodiments that are shown here or are otherwise consistent with embodiments of the present invention may be mounted on a housing and have material 424 removed in order to achieve a thinned, narrow handle portion 120. Pressure sensor 400 shown here may be substantially the same as similar to pressure sensors 100, 200, and 300.

In various embodiments of the present invention, it may be difficult to attach bond wires to bond pads given the small size of the pressure sensor. Accordingly, embodiments of the present invention may stagger or use alternate bond pad configurations to facilitate the bonding of bond wires to the bond pads. An example is shown in the following figure.

Figure 5:
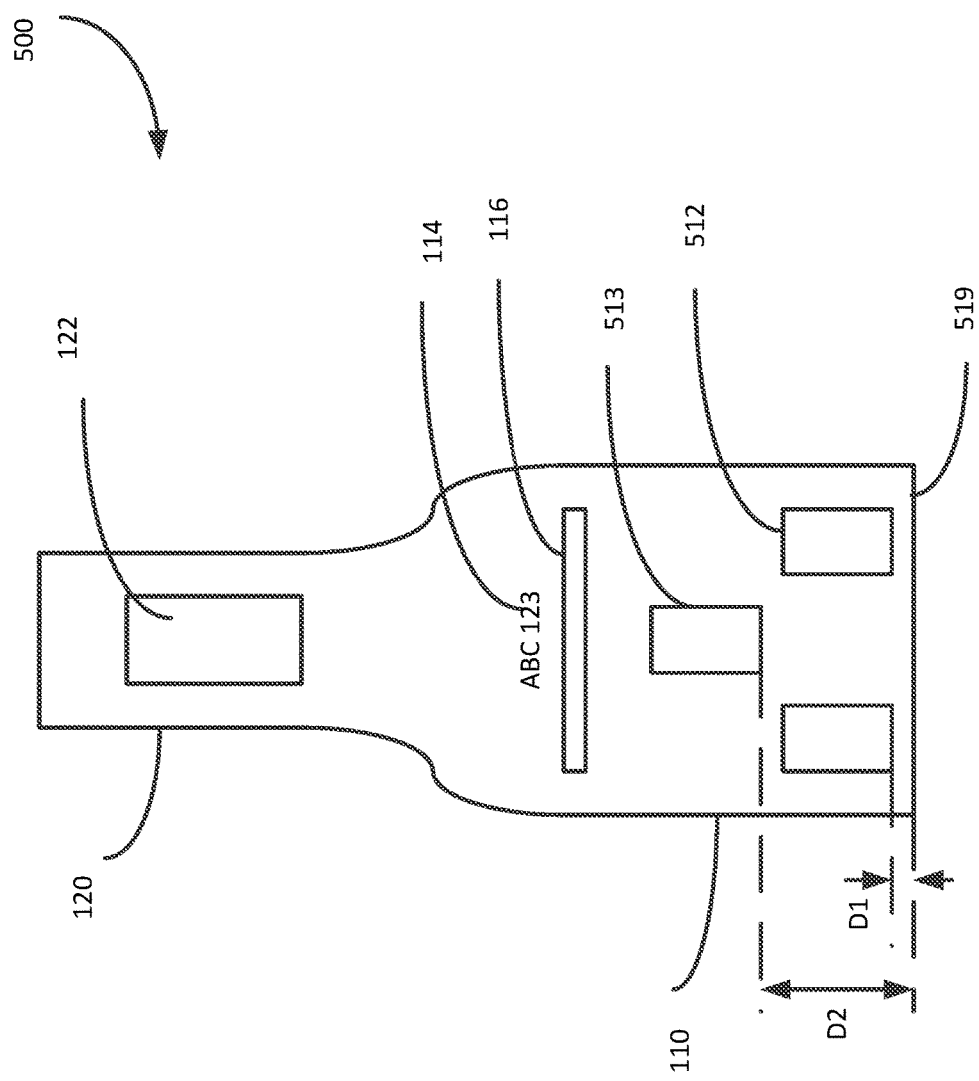
FIG. 5 is a top view of a pressure sensor having staggered pads according to embodiments of the present invention.

FIG. 5 is a top view of a pressure sensor according to embodiments of the present invention. As before, pressure sensor 500 may include a wider base portion 110 tapering to a narrower handle portion 120. Wider base portion 110 may include pads 512 and 513, as well as device identifier 114 and blocking structure 116. Bond pads 512 and 513 may be the same or similar to bond pads 112, and they may be bonded to and epoxied in a same or similar manner as bond pads 112. Narrower handle portion 120 may include membrane 122. A number of resistors or other components (not shown) may be formed on or near membrane 122. These components may be used to form a Wheatstone bridge or other circuit to detect or measure pressure, to process the detected or measured pressure, or for other purposes.

In this example, the bond pads may be staggered. That is, bond pads 512 and 513 may be located at different distances D1 and D2 from a bottom edge 519 of the wider base portion 110 of pressure sensor 500. This may help to facilitate the attachment of bond wires to the bond pads, thereby improving yield and reducing costs.

Blocking structures, such as blocking structures 116 and 216 shown in FIGS. 1 and 2, and tabs, such as tabs 330 shown in FIG. 3, may be included in this and any of the other embodiments that are shown here or are otherwise consistent with embodiments of the present invention. Pressure sensor 500, as with pressure sensor 100, 200, 300, 400, and other pressure sensors consistent with embodiments of the present invention, may be mounted and thinned, narrow handle portion 120 may be formed as shown in FIG. 4. Pressure sensor 200 shown here may be substantially the same as similar to pressure sensors 100, 200, 300, and 400, with the variations in locations of bond pads 512 and 513.

In these and other embodiments of the present invention, these bond pads may be staggered in different ways. An example is shown in the following figure.

Figure 6:
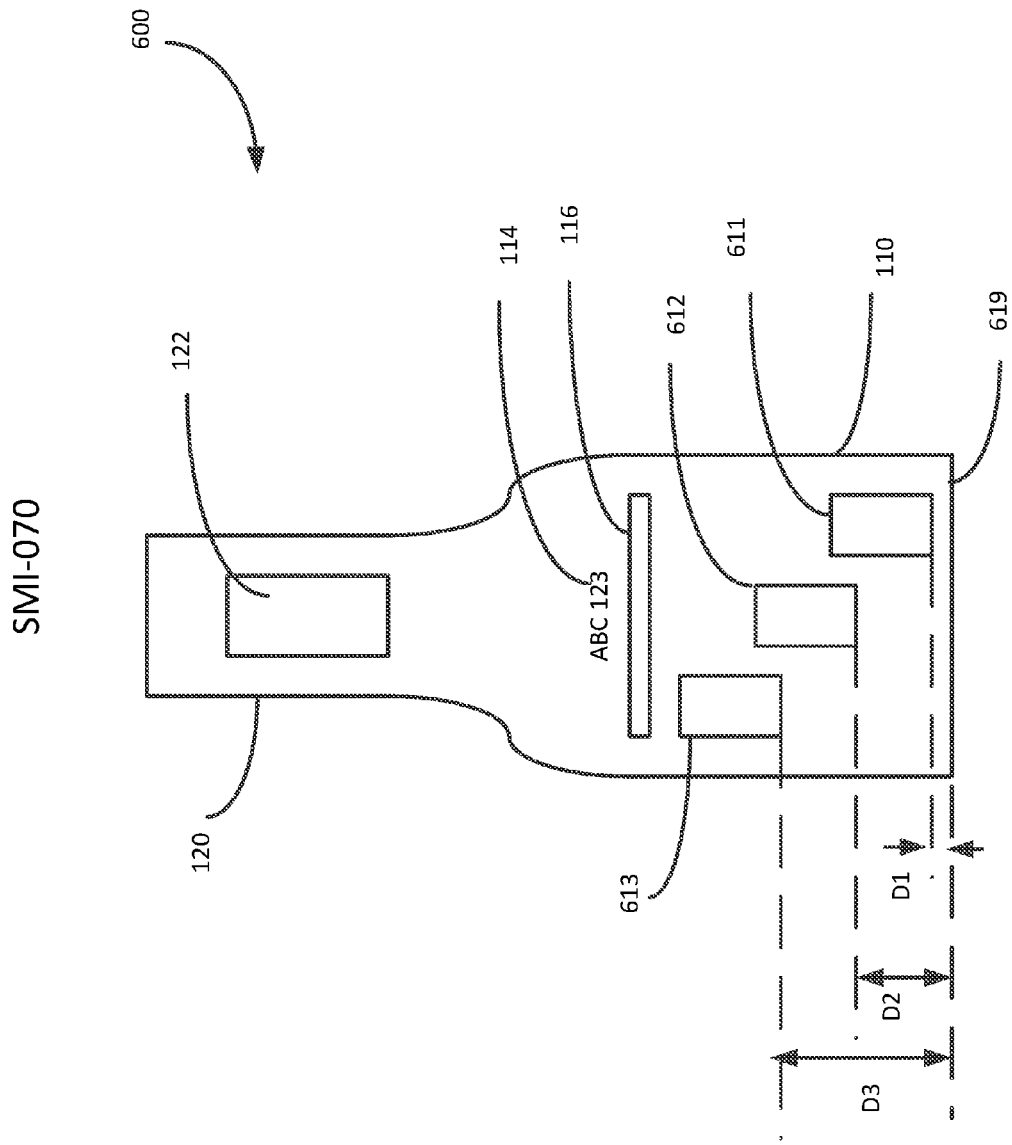
FIG. 6 is a top view of another pressure sensor having staggered pads according to embodiments of the present invention.

FIG. 6 is a top view of a pressure sensor according to an embodiment of the present invention. As before, pressure sensor 600 may include a wider base portion 110 tapering to a narrower handle portion 120. Wider base portion 110 may include pads 611, 612, and 613, as well as device identifier 114 and blocking structure 116. Bond pads 611, 612, and 613 may be the same or similar to bond pads 112, and they may be bonded to and epoxied in a same or similar manner as bond pads 112. Narrower handle portion 120 may include membrane 122. A number of resistors or other components (not shown) may be formed on or near membrane 122. These components may be used to form a Wheatstone bridge or other circuit to detect or measure pressure, to process the detected or measured pressure, or for other purposes.

In this example, the bond pads may be staggered. That is, bond pads 611, 612, and 613 may be located at different distances D1, D2, and D3 from a bottom edge 619 of the wider base portion 110 of pressure sensor 600. This may help to facilitate the attachment of bond wires to the bond pads, thereby improving yield and reducing costs.

Blocking structures, such as blocking structures 116 and 216 shown in FIGS. 1 and 2, and tabs, such as tabs 330 shown in FIG. 3, may be included in this and any of the other embodiments that are shown here or are otherwise consistent with embodiments of the present invention. Pressure sensor 600, as with pressure sensor 100, 200, 300, 400, 600, and other pressure sensors consistent with embodiments of the present invention, may be mounted and thinned, narrow handle portion 120 may be formed as shown in FIG. 4. Pressure sensor 200 shown here may be substantially the same as similar to pressure sensors 100, 200, 300, 400, and 500, with the variations in locations of bond pads 611, 612 and 613.

In these examples, three bond pads are shown on a pressure sensor. In these and other embodiments of the present invention, a pressure sensor may have one, two, four, or more than four bond pads. These bond pads may be arranged in one of the configurations shown here, or in other configurations consistent with embodiments of the present invention.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:
1. A pressure sensor comprising:
 a membrane formed on a top surface of a handle portion of the pressure sensor;
 a base portion opposite the handle portion, the base portion being thicker than the handle portion;
 a plurality of bond pads formed on a top surface of the base portion;

a device identifier on a top surface of the pressure sensor; and a blocking structure on the top surface of the pressure sensor between the plurality of bond pads and the device identifier.

2. The pressure sensor of claim 1 wherein the base portion has a bottom edge away from the handle portion of the pressure sensor, wherein at least one of the plurality of bond pads is spaced a different distance from the bottom edge than at least another one of the plurality of bond pads.

3. The pressure sensor of claim 2 further comprising:
a first tab extending laterally away in a first direction from a top surface of a body of the pressure sensor; and
a second tab extending laterally away in a second direction from a top surface of a body of the pressure sensor, the second direction opposite the first direction.

4. The pressure sensor of claim 3 wherein the first tab includes a first plurality of holes from a top surface of the first tab to a bottom surface of the first tab, the first plurality of holes located at least near the base portion, and
wherein the second tab includes a second plurality of holes from a top surface of the second tab to a bottom surface of the second tab, the second plurality of holes located at least near the base portion.

5. The pressure sensor of claim 4 wherein the first and second pluralities of holes are etched using a KOH etch.

6. The pressure sensor of claim 5 wherein the first and second pluralities of holes are adjacent to the base portion.

7. The pressure sensor of claim 6 wherein the pressure sensor wherein the plurality of bond pads are located between the first tab and the second tab.

8. The pressure sensor of claim 4 wherein the first and second pluralities of holes are etched using a DRIE etch.

9. The pressure sensor of claim 8 wherein the first and second pluralities of holes are adjacent to the base portion.

10. The pressure sensor of claim 9 wherein the plurality of bond pads are located between the first tab and the second tab.

11. The pressure sensor of claim 3 wherein the blocking structure is a trench that is etched into the top surface of the pressure sensor.

12. The pressure sensor of claim 2 wherein the blocking structure is a trench that is etched into the top surface of the pressure sensor.

13. The pressure sensor of claim 12 wherein the blocking structure is etched into the top surface of the pressure sensor when the device identifier is etched.

14. The pressure sensor of claim 13 wherein the trench and device identifier are etched using a KOH etch.

15. The pressure sensor of claim 13 wherein the trench and device identifier are etched using a deep-reactive ion etch (DRIE).

16. The pressure sensor of claim 2 wherein the blocking structure is a raised bar that is deposited on the top surface of the pressure sensor.

17. The pressure sensor of claim 16 wherein the raised bar blocking structure is deposited on the top surface of the pressure sensor when the plurality of bond pads are deposited.

18. The pressure sensor of claim 2 wherein the blocking structure is a raised bar that is solder bumped on the top surface of the pressure sensor.

19. The pressure sensor of claim 18 wherein the blocking structure is solder bumped on the top surface of the pressure sensor when the plurality of bond pads are solder bumped.

20. The pressure sensor of claim 2 wherein the blocking structure comprises a trench and a raised bar.

21. The pressure sensor of claim 2 further comprising:
a housing attached to an underside of the base portion, wherein the housing is not attached to an underside of the handle portion.

22. The pressure sensor of claim 21 wherein the handle portion is thinner than the base portion following an etching of an underside of the handle portion.

23. The pressure sensor of claim 21 wherein the base portion is attached to the housing using epoxy.

24. The pressure sensor of claim 1 further comprising:
a first tab extending laterally away in a first direction from a top surface of a body of the pressure sensor; and
a second tab extending laterally away in a second direction from a top surface of a body of the pressure sensor, the second direction opposite the first direction.

25. The pressure sensor of claim 24 wherein the first tab includes a first plurality of holes from a top surface of the first tab to a bottom surface of the first tab, the first plurality of holes located at least near the base portion, and
wherein the second tab includes a second plurality of holes from a top surface of the second tab to a bottom surface of the second tab, the second plurality of holes located at least near the base portion.

26. The pressure sensor of claim 1 wherein the blocking structure is a trench that is etched into the top surface of the pressure sensor.

27. The pressure sensor of claim 26 further comprising:
a first tab extending laterally away in a first direction from a top surface of a body of the pressure sensor; and
a second tab extending laterally away in a second direction from a top surface of a body of the pressure sensor, the second direction opposite the first direction.

28. The pressure sensor of claim 27 wherein the first tab includes a first plurality of holes from a top surface of the first tab to a bottom surface of the first tab, the first plurality of holes located at least near the base portion, and
wherein the second tab includes a second plurality of holes from a top surface of the second tab to a bottom surface of the second tab, the second plurality of holes located at least near the base portion.

* * * * *